UNITED STATES PATENT OFFICE.

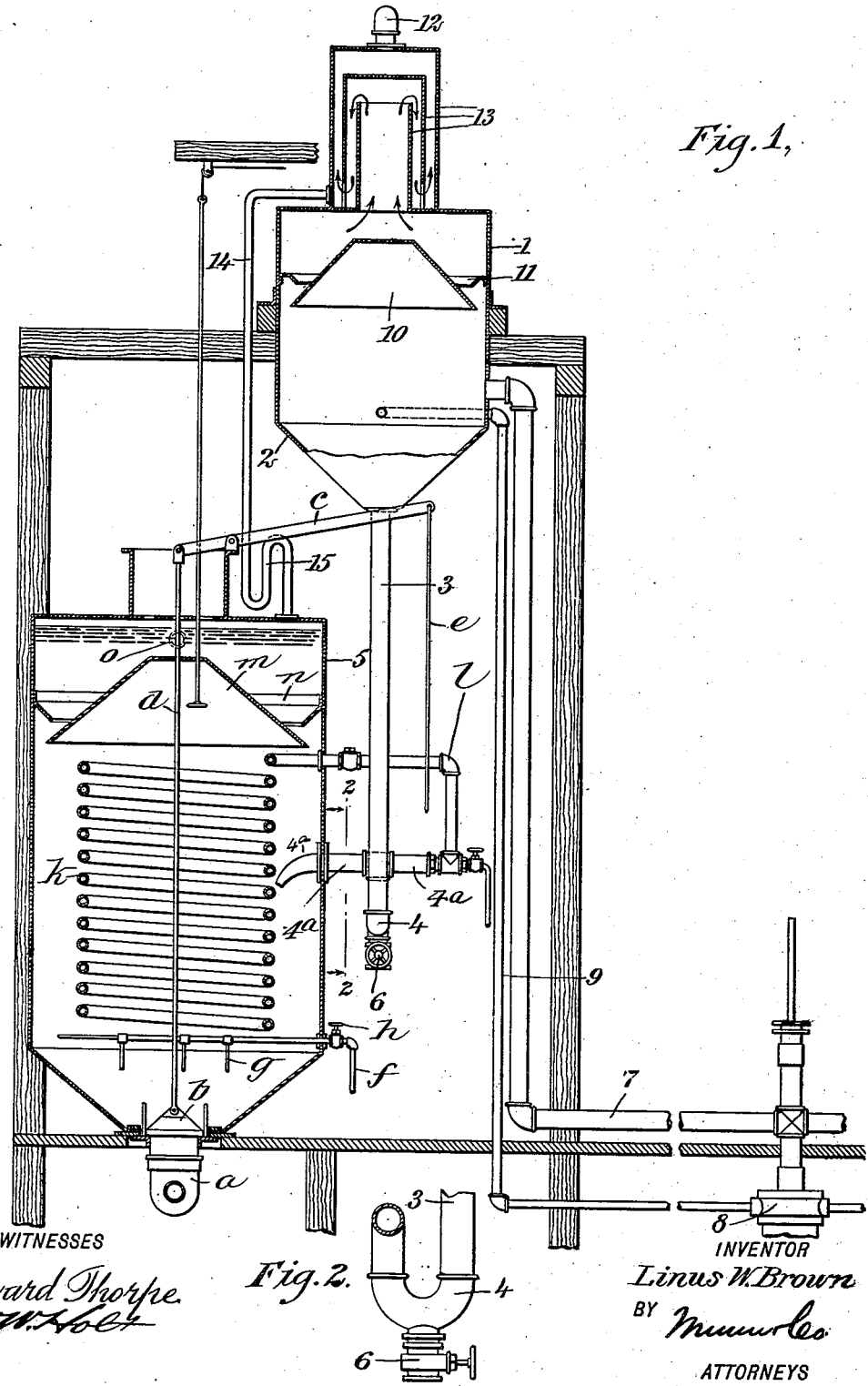

LINUS W. BROWN, OF BAKERSFIELD, CALIFORNIA.

GAS-SEPARATOR FOR OIL-WELLS.

968,534.	Specification of Letters Patent.	Patented Aug. 30, 1910.

Application filed May 29, 1908. Serial No. 435,706.

*To all whom it may concern:*

Be it known that I, LINUS W. BROWN, a citizen of the United States, and a resident of Bakersfield, in the county of Kern and State of California, have invented a new and Improved Gas-Separator for Oil-Wells, of which the following is a full, clear, and exact description.

This invention relates to appliances for the separation of gas from oil and sand contained in crude oil of the California type as it is delivered from oil wells, and is particularly designed to be used in connection with my improved oil and sand separator, partially disclosed herein but which forms the subject matter of an application for patent Serial No. 435,705, filed May 29, 1908.

The invention in a general way consists of a drum to which the sludge from the well is delivered. By the term sludge as herein used, I mean crude petroleum, which in the western portion of this country is a thick, mucky, viscous substance containing fixed gases, sand, water, asphaltine, clay and other minerals in complete emulsion with the oil. The drum is provided with baffle-plates arranged above the level of the sludge, which, in connection with the circuitous discharge passage leading from the top of the drum, operates to separate the entrained oil from the gas. The sand and oil are discharged from the lower portion of the drum preferably to my improved oil and sand separator, and the gas is conveyed by proper pipes, connecting with the top of the gas separator to the furnace or gasometer.

Reference is to be had to the accompanying drawings forming a part of this specification, in which similar characters of reference indicate corresponding parts in both views.

Figure 1 is a central vertical section through my improved gas separator, illustrating the manner in which it is applied to the oil and sand apparatus; and Fig. 2 is a section of the apparatus substantially on the line 2—2 of Fig. 1.

In the construction of the separator I employ a gas separating drum 1 of a suitable capacity, preferably having a conical bottom 2 connecting with a discharge pipe 3, which in turn connects through a trap 4 with the nozzle 4ª of an oil and sand separator tank 5, the trap serving to prevent the heated gas and vapor passing through the nozzle from ascending the discharge pipe, and is preferably provided with a valve 6 for draining the discharge pipe when cleaning out.

The separating tank 5 is shown to have a pipe $a$ leading from the bottom for the discharge of sand, the flow through the said pipe being controlled by a valve $b$ which is connected to the inner end of a lever $c$ through the intermediary of a link or connecting rod $d$. At the opposite and outer end of the lever $c$ it is provided with an operating member $e$. A water-supply pipe $f$ leads into the lower portion of the separating tank and is provided with downwardly and radially-extended nozzles $g$ for washing the sand into the sand pipe when the valve $b$ is lifted, the water-supply pipe $f$ having a controlling valve $h$ for controlling the water supply. Centrally arranged in the separating tank 5 above the nozzles $g$ is a steam coil $k$ having a supply pipe $l$ which is shown to also connect with the nozzle 4ª behind the trap 4. Above the steam coil the tank 5 is provided with baffle-plates $m$ and $n$, with the baffle-plate $m$ of approximately conical form and surrounded by the baffle-plate $n$, the said plates serving to prevent the passage of the sand with the oil into the upper portion of the tank, at which point the tank is provided with a discharge or outlet pipe $o$ for the oil. The specific construction of the separating tank is entered into for the sole purpose of showing its connection with the gas separator.

A delivery pipe 7 for the crude oil passes from the oil well through the oil well casing 8 and connects to the drum 1 a substantial distance above its bottom. A pipe 9 leads from the upper portion of the well casing to approximately the same level of the drum or slightly therebelow for the passage of any free gas which might be confined within this portion of the well casing.

Above the points of discharge of the pipes 7 and 9, the drum has baffle-plates, two of which plates are shown, 10 and 11 respectively, the plate 10 being of conical form and of slightly less diameter than the internal diameter of the drum, and the plate 11 being attached to the inner surface of the drum slightly above the bottom of the plate 10, and inclining downwardly to the center, as shown. The top of the drum is in communication with a circuitous passage leading to a discharge pipe 12, which carries the gas to the boiler or other point in use. This circuitous passage is preferably effected by providing a number of cylinders 13, concentrically arranged one within the other, each cylinder communicating with the adjacent cylinder, or cylinders, at its opposite ends. From the lower portion of the outer cylinder, an oil drain pipe 14 leads to the oil and sand separator tank near which it is provided with a trap 15, the latter serving to permit of the escape of the oil to the separating tank while cutting off the escape of the gas in this direction.

In the operation of the separator, the gas separates from the sand and oil of the crude oil as it is delivered into the drum, and, together with the gas passing through the pipe 9, travels around the baffle-plates and thence through the passages afforded by the cylinders 13, to the discharge pipe 12. The baffle-plates separate from the rising gas any entrained sand and the major portion of the entrained oil which, as they separate, fall to the bottom of the drum and pass down the pipe 3. Such oil as remains intermingled with the gas is collected between the cylinders 13 and passes to the oil and sand separator through the pipe 14. The sand and oil in the tank pass continuously to the oil and sand separator during the operation of the apparatus.

As will be seen, it is not necessary for the gas separator to be attached to my oil and sand separating device as shown, but may be erected entirely separate therefrom, and allowed to discharge oil and sand into a sump, or other device for leaching or separating the same from the oil.

Having thus described my invention, I claim as new and desire to secure by Letters Patent:

1. In combination with an oil well, a drum, means for delivering crude oil from the well to the drum, baffle-plates arranged within the drum above the point of delivery of the crude oil, a device in communication with the upper portion of the drum, having a circuitous passage for the outlet of the crude oil gas, a sand and oil separator, and means for discharging the crude oil from the lower portion of the drum into the separator as fast as it is received from the well.

2. In combination with an oil well, a drum, means for delivering the crude oil from the well to the drum, independent means for delivering the gas from the upper portion of the well casing to the drum, means for discharging said gas and the gas contained in the crude oil at the upper portion of the drum, and means for discharging the crude oil at the lower portion of the drum.

3. The combination of a drum, means for delivering crude oil to the drum, baffle plates within the drum, arranged above the point of delivery of the crude oil, a plurality of concentric communicating cylinders carried on the upper portion of the drum, providing a circuitous gas passage leading from the drum, and a pipe for the discharge of the crude oil, leading from the lower portion of the drum.

4. The combination of a drum, an oil and separating tank, means for delivering crude oil to the drum, baffle-plates arranged in the drum above the point of delivery of the crude oil, a circuitous discharge passage for the gas from the crude oil, leading from the upper portion of the drum, a drain pipe leading from the lower portion of said passage to the oil and sand separating tank, having a trap in its length, and a pipe for the discharge of the crude oil leading from the lower portion of the drum to the oil and sand separating tank.

5. The combination of a drum, an oil and sand separating tank, means for delivering crude oil to the drum, means to separate the gas from the oil and sand of the crude oil, a trap, and a pipe leading from the lower portion of the drum for the discharge of the sand and oil to the oil and sand separating tank through said trap.

6. The combination of a drum, an oil and sand separating tank, means for delivering crude oil into the drum, a discharge pipe for the crude oil leading to the sand and oil separating tank, and a device connecting with the upper portion of the tank, having a gas discharge passage composed of a series of connecting portions arranged side by side.

In testimony whereof I have signed my name to this specification in the presence of two subscribing witnesses.

LINUS W. BROWN.

Witnesses:
 JAMES E. ENGLAND,
 W. H. CASTLE.